Figure 1:
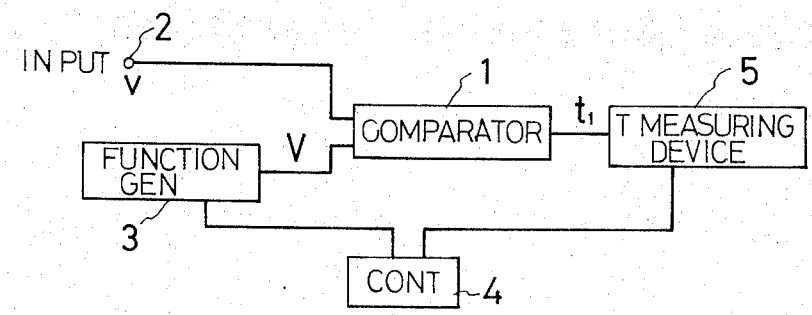

United States Patent [19]

Shimomura

[11] 3,766,782

[45] Oct. 23, 1973

[54] TEMPERATURE MEASURING APPARATUS

[76] Inventor: Naonobu Shimomura, No. 13-8, Sakuragaoka-cho, Shibuya-ku, Tokyo, Japan

[22] Filed: Jan. 11, 1971

[21] Appl. No.: 105,232

[30] Foreign Application Priority Data

| Jan. 19, 1970 | Japan | 45/4955 |
|---|---|---|
| Feb. 28, 1970 | Japan | 45/17263 |
| Mar. 17, 1970 | Japan | 45/22406 |
| Mar. 22, 1970 | Japan | 45/23871 |
| Mar. 28, 1970 | Japan | 45/26210 |
| Apr. 19, 1970 | Japan | 45/33289 |
| July 9, 1970 | Japan | 45/60190 |
| Mar. 10, 1970 | Japan | 45/23022 (utility model) |

[52] U.S. Cl............ 73/359, 73/362 AR, 235/151.3, 235/183
[51] Int. Cl........ G01k 7/02, G01k 7/20, G06g 7/18
[58] Field of Search..................... 73/341, 359, 361, 73/362 AR; 235/151.3, 183

[56] References Cited
UNITED STATES PATENTS

| 3,477,292 | 11/1969 | Thornton | 73/362 AR |
| 3,620,082 | 11/1971 | Peters | 73/362 AR |
| 3,530,716 | 9/1970 | Truppe et al. | 73/359 X |
| 3,459,925 | 8/1969 | Goosey et al. | 73/361 X |
| 3,350,942 | 11/1967 | Peltola | 73/339 A |
| 3,318,133 | 5/1967 | Hahn | 73/1 F |

OTHER PUBLICATIONS

Harrison, T. J., Nonlinear Dual Integrating Ramp ADC, In IBM Technical Disclosure Bulletin, Vol. 11, No. 6, Nov. 1968, p. 623.

Primary Examiner—Richard C. Queisser
Assistant Examiner—Frederick Shoon
Attorney—Clario Ceccon

[57] ABSTRACT

Where a value of a variable $y$ which is a function of an observable variable $v$, given in the form $y = f(v)$, is to be determined, an inverse function $v = g(y)$ is produced, and the variable $y$ is replaced by a time variable to form a function $V = g(ct)$, where $c$ is a constant. To the input of a comparator are applied the variable $v$ and the function $V$ from a function generator which is started by a controller at $t = 0$. At the same time, a time measuring device is operated and subsequently stopped by a coincidence pulse produced by the comparator at $t = t_1$. Assuming that the variables $v$ and $V$ have the respective values of $v_1$ and $V_1$, it follows that $v_1 = V_1$, $V_1 = g(ct_1)$, and as a result, the value of the variable $y$ at the time $t_1$, $y_1$, is given by the following relationship:

$$y_1 = f(v_1) = f(V_1) = f(\ g(ct_1)\ ) = ct_1$$

as long as the both functions $f(v)$ and $g(y)$ remain single-valued functions.

According to the invention, an electrical signal derived from a temperature measuring resistor or a thermocouple is used to cause a function generator to produce V in a manner to correspond to the above expression $v = g(y)$, thereby providing measurement of a temperature as a function of time.

10 Claims, 13 Drawing Figures

TEMPERATURE MEASURING APPARATUS

The invention relates to a temperature measuring apparatus.

In the measurement of temperatures, the prior art practice to provide correction for the non-linearity of the response of a temperature sensitive sensor such as temperature measuring resistor or thermocouple has been to use either a broken line approximation or feedback in an amplifier. The former approach comprises combining a number of resistors and diodes into a circuit so as to correct the non-linear response. This involves extremely complex adjustment of the values of various resistors, and where the circuit comprises a plurality of sections, an adjustment made in one section has an upsetting influence upon the adjustment of other sections, so that repeated adjustments are required. On the other hand, the latter technique relies on the non-linearity of the amplifier so that adjustment must be made for the most part experimentarily. Other approaches include a correction in a digital manner, but the resulting circuit is disadvantageously complex. In either technique, the prior art correction is only approximate.

Therefore, it is an object of the invention to overcome the above disadvantages of the prior art by providing a temperature measuring apparatus which is extremely simple in construction and provides theoretical accuracy.

It is a further object of the invention to provide a temperature measuring apparatus for use in industrial and laboratory temperature measurement.

It is still another object of the invention to provide a temperature measuring apparatus that provides an indication either in analog or digital form or provides a record thereof and which is suited to provide an indication at a remote location.

Figure 2:
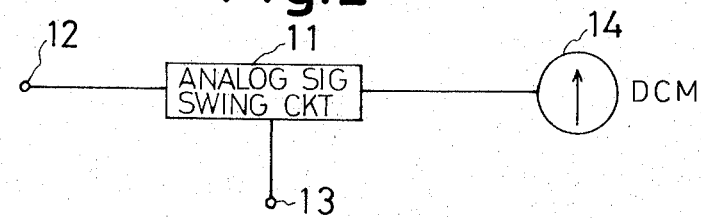
Figure 3A:
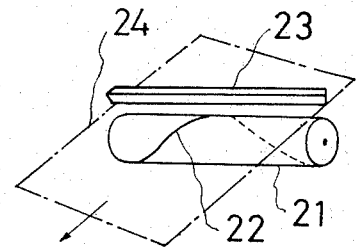
Figure 3B:
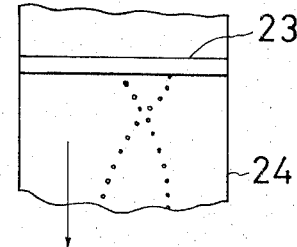
Figure 4:
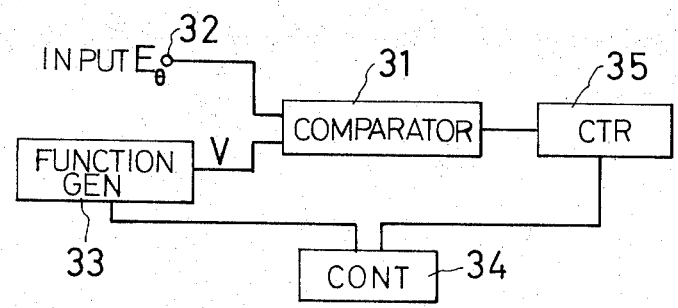
Figure 5:
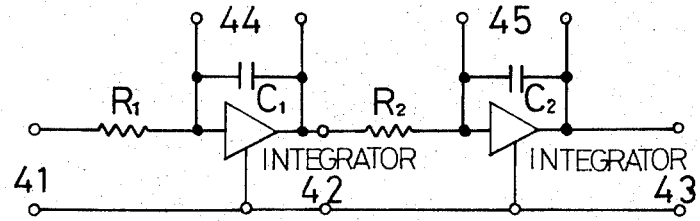
Figure 6:
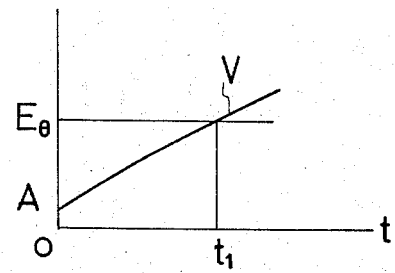
Figure 7:
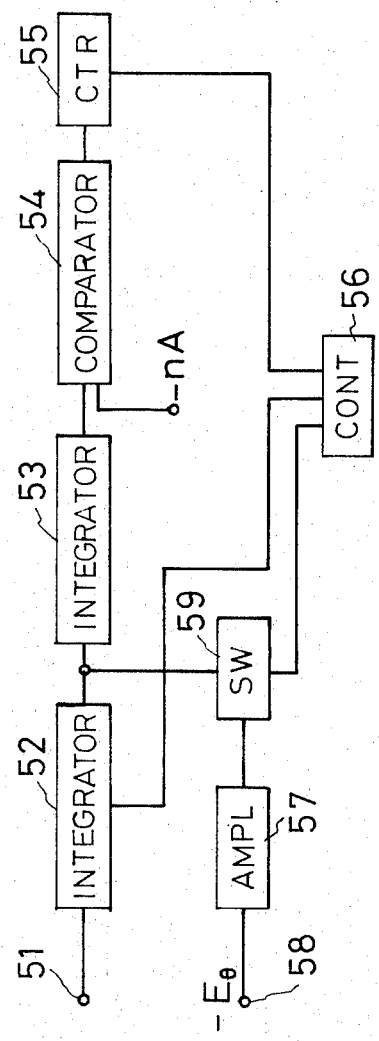
Figure 8:
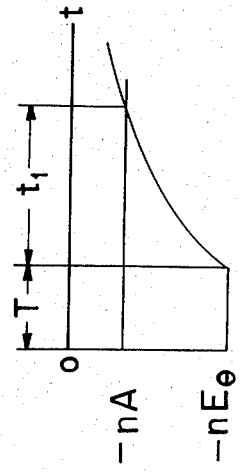

While the specification concludes with claims which particularly and distinctly point out the invention, a complete understanding of its system of operation in a specific embodiment will be obtained from the following description taken in conjunction with the attached drawings, in which:

FIG. 1 is a block diagram illustrating the principle of the invention,

FIG. 2 shows an analog indicating mechanism of the apparatus according to the invention, FIGS. 3A and 3B show a recording mechanism of the apparatus, FIG. 4 is a block diagram of an example of the temperature measuring circuit constructed according to the invention, FIG. 5 is a circuit diagram of a function generator used in the present invention, FIG. 6 shows a wave form produced by the measuring circuit of FIG. 4, FIG. 7 is a block diagram of a common integrating circuit constructed according to the invention, FIG. 8 shows a waveform produced by the circuit of FIG. 7, and FIGS. 9A–9D are time-charts for explaining the operation of each of the parts of FIG. 4.

Referring to the drawings, the principle of the invention is illustrated in FIG. 1, in which reference numeral 1 denotes a comparator, 2 an input terminal, 3 a function generator, 4 a controller and 5 a time measuring device. When it is desired to obtain the value of $y$ which is given as a function of an observable signal $v$, in the form $y = f(v)$, an inverse function $v = g(y)$ is formed and the variable $y$ is replaced by a time variable $t$ to form a function $$V = g(ct)$$

where $c$ denotes a constant. In the block diagram of FIG. 1, the variable $v$ is applied to the input terminal 2 of the comparator 1, and to the other input terminal of the comparator is applied an output $V$ from the function generator 3. The function generator 3 is started by the controller 4 at time $t = 0$. At the same time, the time measuring device 5 is operated.

There will then be a coincidence pulse produced from the comparator 1 at time $t = t_1$, which pulse is used to stop the time measuring device 5. Assuming that the variables $v$ and $V$ had the respective values of $v_1$ and $V_1$ at this time, it follows that $$v_1 = V_1, \; V_1 = g(ct_1)$$

As long as $f(v)$ and $g(y)$ remain to be single-valued functions, the following relationship applies;

$$y_1 = f(v_1) = f(V_1) = f(\,g(ct_1)\,) = ct_1$$

(1)

As a result, the value $y_1$ can be obtained by measurement of the time $t_1$.

By using a frequency counter for the time measuring device 5 and assuming the frequency to be counted is denoted by $c$, the counter will have a count of $ct_1$ at the time of coincidence, so that from the equation (1), the value $y_1$ is directly read on the counter. The indication of the counter may be given either in decimal or binary system or in any other coding system such as binary coded decimal system which is suitable for use as a control signal. Further, the counter output may be subjected to digital-to-analog conversion to obtain the result in an analog form. FIG. 2 shows another example of analog indication wherein an analog signal switching circuit 11 allows a constant voltage at a terminal 12 to be applied to a d.c. indication meter 14 for the time interval of $t_1$ determined by a signal applied to a terminal 13. When the controller 4 of FIG. 1 causes the above mentioned operation to be repeated at a constant time interval, the output from the comparator 1 may be used to control the signal applied to the terminal 13 of FIG. 2 in order to permit the d.c. meter 14 to indicate a value that is proportional to the magnitude of $t_1$. The value of $y$ can be registered in a recorder by obtaining the value of $ct_1$ in such an analog manner or by using the technique shown in FIG. 3.

In FIG. 3A, numeral 21 denotes a drum that is rotated in synchronism with the period of repetition of the controller 4 shown in FIG. 1. The drum 21 has a helically running projection 22 on its surface. Numeral 23 denotes a printer bar that is normally held apart from the drum 21 by a spring, not shown, but is forced against the projection 22 by an electromagnet in response to a pulse from the comparator at time $t_1$, thereby marking a dot on a pressure sensitive record paper 24 extending between the parts 22 and 23. The record paper 24 is kept moving with a constant speed in the direction indicated by an arrow, so that successive values of $y$ will be recorded on the record paper 24 as a series of dots, as shown in FIG. 3B. A multiple recording is possible with such a recording system, and thus a single recorder can be used to provide a record of signals from a plurality of comparators.

As will be noted from the foregoing, the output from the temperature measuring apparatus of the invention can be used to provide a digital or analog indication on a record or for transfer in the form of digital or analog signals.

When measuring temperatures with a temperature measuring resistor or thermocouple, an electrical signal derived therefrom is given as a function of temperature. To give an example, the resistance of a temperature measuring resistor at a temperature of $\theta$ is generally expressed in the following form:

$$R_\theta = Rs + \alpha\theta + \beta\theta^2 \qquad (2)$$

where Rs, $\alpha$ and $\beta$ are constants inherent to the resistor, and the electrical signal obtained will be proportional to $R$ or its variable factor $\theta + \theta^2$. Where a thermocouple is used, the thermo-electromotive force is generally expressed as follows:

$$e_\theta = a\theta + b\theta^2 + d\theta^3 \qquad (3)$$

where $a$, $b$ and $d$ are constants inherent to the thermocouple and $\theta$ represents the difference between the temperature to be measured and a reference temperature. While the equation (3) includes a tertiary term, the equation may be reduced to the second order for most practical purposes, and thus it may be so treated in the description hereinafter without losing the general applicability. Temperature measuring resistors and thermocouples are most often used to provide precise temperature measurements, but the non-linearity of electrical signals obtained therefrom has presented a serious difficulty in the temperature measurement, which is heretofore often solved by approximating means by using a linearizer.

In accordance with the invention, there is provided a temperature measuring apparatus in which the temperature is accurately derived by mathematical formula from the electrical signal represented by an equation of second or third order of temperature, without recourse to such approximating means. When an electrical signal obtained from a temperature measuring resistor or thermocouple is passed through a circuit having linearity, such as an amplifier, the resulting signal which is observable will generally be given by the following expression:

$$E_\theta = A + B\theta + C\theta^2 \qquad (4)$$

where A, B and C are constants determined by the temperature measuring resistor or thermocouple and the circuit arrangements. By comparison with the inverse function $v = g(y)$ mentioned above, it will be noted that the observable signal is $v = g(y)$, to which $E_\theta$ of the equation (4) corresponds, and that the amount to be determined is $y$, to which $\theta$ of the equation (4) corresponds. Hence, by producing a waveform from a function generator that is represented by the following expression:

$$V = A + Bct + Cc^2t^2 \qquad (5)$$

and by deciding the time $t_1$ when $$E_\theta = V \qquad (6)$$

there will be obtained the following relationship:

$$\theta_1 = ct_1 \qquad (7)$$

by similarity with the equation (1), and the temperature $\theta_1$ can be determined in this manner.

FIG. 4 shows an example of the circuit which effects such a measurement. In this Figure, numeral 31 denotes a comparator having an input terminal 32, to which $E_\theta$ is applied, and another input, to which the output of a function generator 33 is applied, the function generator producing a function as indicated by the equation (5). A controller 34 is provided to initiate the counting operation by a counter 35 and the operation of the function generator 33 at $t = 0$.

After a time interval of $t_1$, the two inputs to the comparator 31 will become equal to each other, thereby producing a coincidence pulse therefrom which stops the counting operation of the counter 35 to establish the value of $ct_1$.

Figure 9A:
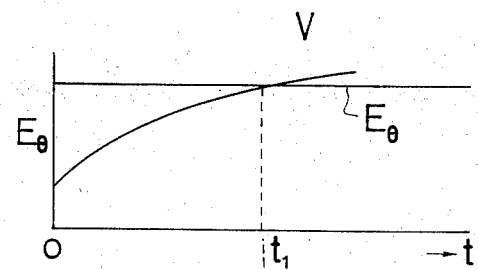
Figure 9B:
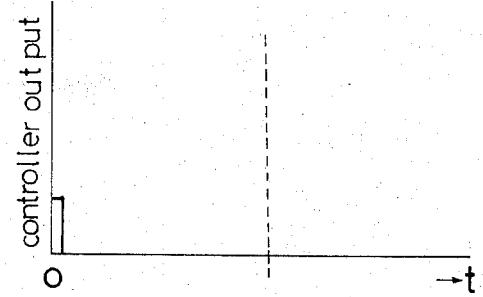
Figure 9C:
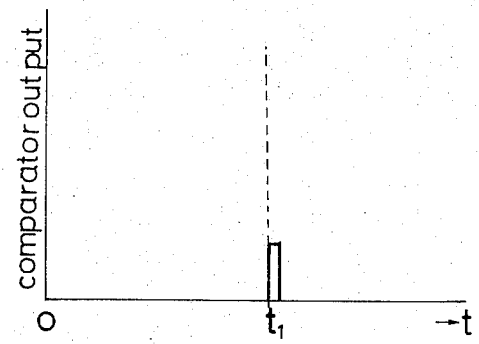
Figure 9D:
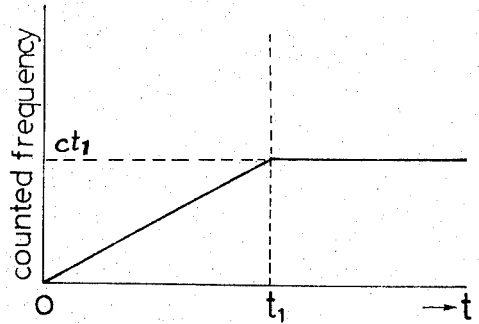

FIG. 9A–9D is a time-chart for explaining the state in operation of each parts in FIG. 4. The comparator, function generator, counter, controller or the likes in FIG. 4 are good enough to bring into full performance of the apparatus even if they are that of commonly used. For example, a comparing circuit described in "DENSHI KEISOKU (Electronics measurement), vol. 9, No. 2, 1969 page 28" may be suitable for the comparator, and a counter described in "DENSHI KEISOKU (Electronics measurement) vol. 9, No. 2, 1969 page 36 – 39" may be suitable for the counter. FIG. 9A represents $E\theta$ and V in waveform which is charged with a terminal of the input side of the comparator 31. FIG. 9B shows an output pulse of controller 34, the output at time $t = 0$ makes the function generator start and simultaneously makes the counting operation of counter 35 start. When the input $E\theta$ of the comparator gets equal to the other input $V$ of said comparator, after a time of $t_1$ being passed, a coincidence pulse is generated from comparator 31. The state is shown in FIG. 9C. At this time, counting operation of counter 35 is stopped and indicate a temperature. This state is shown in FIG. 9D.

FIG. 5 is a circuit diagram showing an example of the function generator 33 of FIG. 4. The function generator shown comprises an integrator having an input terminal 41 and an output terminal 42, and another integrator having an input terminal at 42 and an output terminal 43, both integrators being in cascade connection. By providing a constant $k_1$ across terminals 44 and a constant $k_2$ across terminals 45 at $t = 0$, and choosing these constants as well as input voltage $E_{01}$ applied across the input terminals 41 as follows:

$$E_{01} = 2 R_1 R_2 C_1 C_2 C c^2 \qquad (8)$$

$$k_1 = - R_2 C_2 B c \qquad (9)$$

$$k_2 = A \qquad (10)$$

then the output obtained across the output terminals 43 will be $$E_{02} = A + Bct + Cc^2t^2$$

(11)

which is of the waveform indicated by the equation (5). Such waveform is shown in FIG. 6. Where the equation (5) includes a tertiary factor, three integrators may be used to effect a similar measurement instead of the two integrators shown in FIG. 5.

In an industrial instrumentation, $E_\theta$ applied to the terminal 32 of FIG. 4 often include noise components, and in such an instance, it is effective to have an integration of $E_\theta$ for a period of time determined by the period of noises in order to obtain $nE_\theta$ that is proportional to $E_\theta$ and at the same time to have the output of function generator 33 multiplied by a factor of $n$ to give $nV$. In this case, an arrangement as shown in FIG. 7 may be used so that part of the integrators used in the function generator can be shared by signal integration.

In FIG. 7, numerals 52 and 53 denote integrators in cascade connection which together form a function generator. Numeral 54 denotes a comparator, 55 a counter and 56 a controller. Numeral 57 denotes an amplifier with a sufficiently low output impedance having an input terminal 58 to which is applied $-E_\theta$. The output of the amplifier 57 is connected through a switch 59 with the input of the integrator 53. At $t = \theta$, the controller renders the switch 59 conductive, whereby the input voltage to the integrator 53 is fixed at the output voltage of the amplifier having the low output impedance. Then the integrator 53 will have an output as shown in FIG. 8. The output varying linearly for a time interval of T selected in connection with the period of noises and reaching a value of $-nE_\theta$ at $t = T$. At $t = T$, the controller 56 turns the switch 59 off and operates the integrator 52 and initiates the counting operation by the counter 55. After a time interval of $t_1$, the two inputs to the comparator 54 reach coincidence, whereby a pulse is produced to stop the counter, thereby providing an indication of $ct_1$.

Though in the foregoing the invention has been described as applied to a temperature measuring apparatus incorporating either a temperature measuring resistor or thermocouple, the invention is also applicable where these or other temperature sensitive elements are used in combination.

The present invention can be also utilized to derive a value of certain function of temperature directly. The following explains how to get the reciprocal value of temperature. Assuming that $\theta$ in the equation (4) is represented by absolute temperature, the reciprocal thereof is expressed by $$u = (1/\theta)$$

(12)

substituting the above relationship in equation (4), we get $$\theta = C - Bu + (E_\theta - A)u^2$$

(13)

comparing equation (13) with (4), it is noted that although the coefficient of each term is different, the form of equation (13) remains same as that of equation (4). Accordingly we can obtain the value of u of equation (13) by generating a function of time represented by $$C - Bct + (E_\theta - A)c^2t^2$$

(14)

and measuring the time $t_1$ at which $$C - Bct_1 + (E_\theta - A)c^2t_1^2 = 0$$

(15)

Then we get $$u = ct_1$$

(16)

In many practical applications, since the variation of temperature is not rapid, we can assume $E_\theta$ as constant during the above time interval $t_1$, so the waveform of (14) can be generated by the function generator of FIG. 5 corresponding to the equation (5) by substituting $A$ of equation (5) by C of (14), B of equation (5) by $-B$ of (14), C of equation (5) by $(E_\theta - A)$ of (14). The value of $C$ in equation (8), value of $B$ in equation (9), value of $A$ in equation (10) should be also substituted accordingly. The value of $c$ in equations (8), (9), may be selected properly. Thus we can generate the waveform of (14) by using the circuit of FIG. 5. In case a counter is used for the time measuring device, by selecting the counting frequency thereof equal to $c$, the numerical value of the reciprocal of the absolute temperature is obtained directly in the counter. As these values are below the decimal point for many practical applications, a suitable proportionalty constant should be used to select the value of $c$. This is useful for such application to convert the quantity of volumetric flow of gas into a quantity of mass flow especially in case the temperature of the gas changes gradually. For such application by selecting the value of $c$ or the counting frequency of the counter properly, the quantity of mass flow is directly obtained in the counter. By repeating the above process periodically without resetting the counter each time, the accumulated quantity of mass flow under varying temperature is indicated at the counter by using a volume type flow meter.

What I claim is:

1. A temperature measuring apparatus comprising: a temperature sensor providing electrical signals representing a quadratic function of the measured temperature; a function generator comprising first and second integrators operated in cascade so that the second integrator integrates the output of the first integrator to produce a quadratic function of time in the form of an electrical signal; means for comparing said two electrical signals and producing an output at their coincidence in value, and a time measuring device to measure the time interval between the start of the said function of time and said coincidence of the said function of time and the said electrical signal derived from the said temperature sensor.

2. A temperature measuring apparatus as in claim 1 wherein said temperature sensor is a temperature measuring resistor.

3. A temperature measuring apparatus as in claim 1 wherein said temperature sensor is a thermocouple.

4. A temperature measuring apparatus as in claim 1 wherein said time measuring device is an electronic counter.

5. A temperature measuring apparatus as in claim 1 further including indicating means for displaying the time interval measured.

6. A temperature measuring apparatus as in claim 1 wherein measurements are repeated at a fixed cyclic rate, and further comprising a constant voltage source, a switch connected to said voltage source and controlled to be conductive during the said time interval, and a meter connected to said switch, said meter indicating the average value of current conducting during the said time interval of each of said fixed cycles.

7. A temperature measuring apparatus as in claim 1 wherein said time measuring device includes a recorder which prints a dot on a recording medium at the end of each measurement of said time interval at a point whose distance from a reference line of the recording medium is proportional to said time interval.

8. A temperature measuring device as in claim 1 wherein measurements are repeated at a fixed cyclic rate of measurement, said time measuring device includes a recorder comprising a rotating means which rotates in synchronism with said cylic rate of measurement, a printing means capable of imprinting a mark at the end of said time interval onto a recording medium located between the said rotating means and said printing means such that the mark is imprinted at a point whose distance from a reference line of the recording medium is proportional to said time interval.

9. A temperature measuring apparatus comprising: a temperature sensor providing electrical signals representing a quadratic function of the measured temperature; a function generator comprising first and second integrators in series; Switching means connected between the input of said second integrator and said electrical signals and having a first position wherein said second integrator integrates said electrical signals derived from the said temperature sensor for a predetermined period of time thereby producing a signal output proportional to the electrical signals derived from said temperature sensor, and having a second position wherein said first and second integrators are in cascade such that the second integrator integrates the output of the first integrator thereby producing a function of time represented by a quadratic equation, comparison means connected to the output of said second integrator and producing an output at the coincidence between said function of time and a predetermined value; and a time measuring device to measure the time interval between the start of said function of time and the time of coincidence thereof with said predetermined value.

10. A reciprocal of temperature measuring apparatus comprising: a temperature sensor providing electrical signals represented by a quadratic function of the measured temperature; a function generator comprising first and second integrators operated in cascade, the first integrator receiving as its input the electrical signals derived from the said temperature sensor, and the second integrator integrating the output of the first integrator, thereby producing a function of time in the form of an electrical signal representing a quadratic equation of time with the coefficient of the quadratic term containing the signal derived from the said temperature sensor; comparison means connected to the output of said second integrator and producing an output at the coincidence between said function of time and a predetermined value, and a time measuring device to measure the time interval between the start of the said function of time and the coincidence of the said function of time with said predetermined value.

* * * * *